(12) United States Patent
Sathianathan et al.

(10) Patent No.: US 6,638,008 B2
(45) Date of Patent: Oct. 28, 2003

(54) GAS TURBINE ENGINE BLADE CONTAINMENT ASSEMBLY

(75) Inventors: Sivasubramaniam K Sathianathan, Burton on Trent (GB); Stephen J Booth, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/098,576

(22) Filed: Mar. 18, 2002

(65) Prior Publication Data

US 2002/0141859 A1 Oct. 3, 2002

(30) Foreign Application Priority Data

Mar. 30, 2001 (GB) ............................................. 0107973

(51) Int. Cl.$^7$ ............................................. F01D 21/00
(52) U.S. Cl. ..................... 415/9; 415/214.1; 415/220
(58) Field of Search ............................ 415/119, 214.1, 415/220, 9

(56) References Cited

U.S. PATENT DOCUMENTS

| | | | | |
|---|---|---|---|---|
| 5,485,723 A | * | 1/1996 | McCoy et al. | 60/226.1 |
| 5,516,257 A | * | 5/1996 | Kasprow et al. | 415/9 |
| 6,059,524 A | * | 5/2000 | Costa et al. | 415/9 |
| 6,382,905 B1 | * | 5/2002 | Czachor et al. | 415/9 |

FOREIGN PATENT DOCUMENTS

| | | |
|---|---|---|
| EP | 965731 A | 12/1999 |
| GB | 2115487 A | 9/1983 |
| WO | WO 10812 A | 9/1990 |

\* cited by examiner

*Primary Examiner*—Ninh H. Nguyen
(74) *Attorney, Agent, or Firm*—W. Warren Taltavull; Manelli, Denison & Selter PLLC

(57) ABSTRACT

A gas turbine engine fan blade containment assembly (38) comprising a generally cylindrical, or frustoconical, metal casing (40) has an upstream portion (56), a transition portion (58) and a blade containment portion (54). The upstream portion (56) has a flange (42) connecting the metal casing (40) to a flange (48) on axially adjacent casing (46). The blade containment portion (54) has a greater thickness ($T_2$) than the thickness ($T_1$) of the upstream portion (54). The transition portion (58) connects the blade containment portion (54) and the upstream portion (56) to transmit loads from the blade containment portion (54) to the flange (42) on the upstream portion (56). The ratio of the thickness ($T_4$) of the flange (42) on the upstream portion (56) to the thickness ($T_1$) of the upstream portion (56) is between 3 to 1 and 6 to 1. The flange (42) on the upstream portion (56) is radially scalloped (41) between adjacent fasteners (49,51) and the upstream portion (54) is relatively thin such that the flange (42) and upstream portion (56) are allowed to deform to reduce impact loads transmitted to the flange (48) on the casing (46).

16 Claims, 3 Drawing Sheets

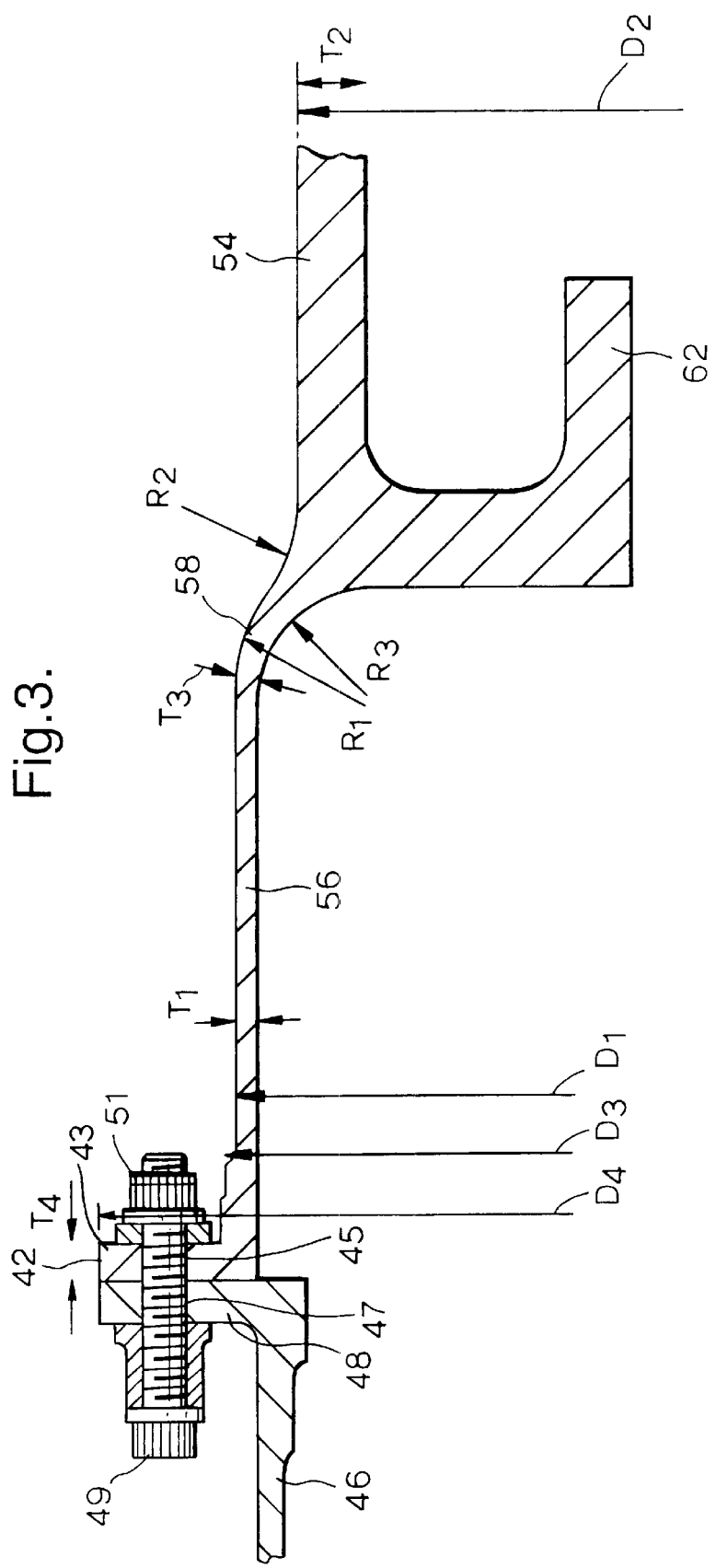

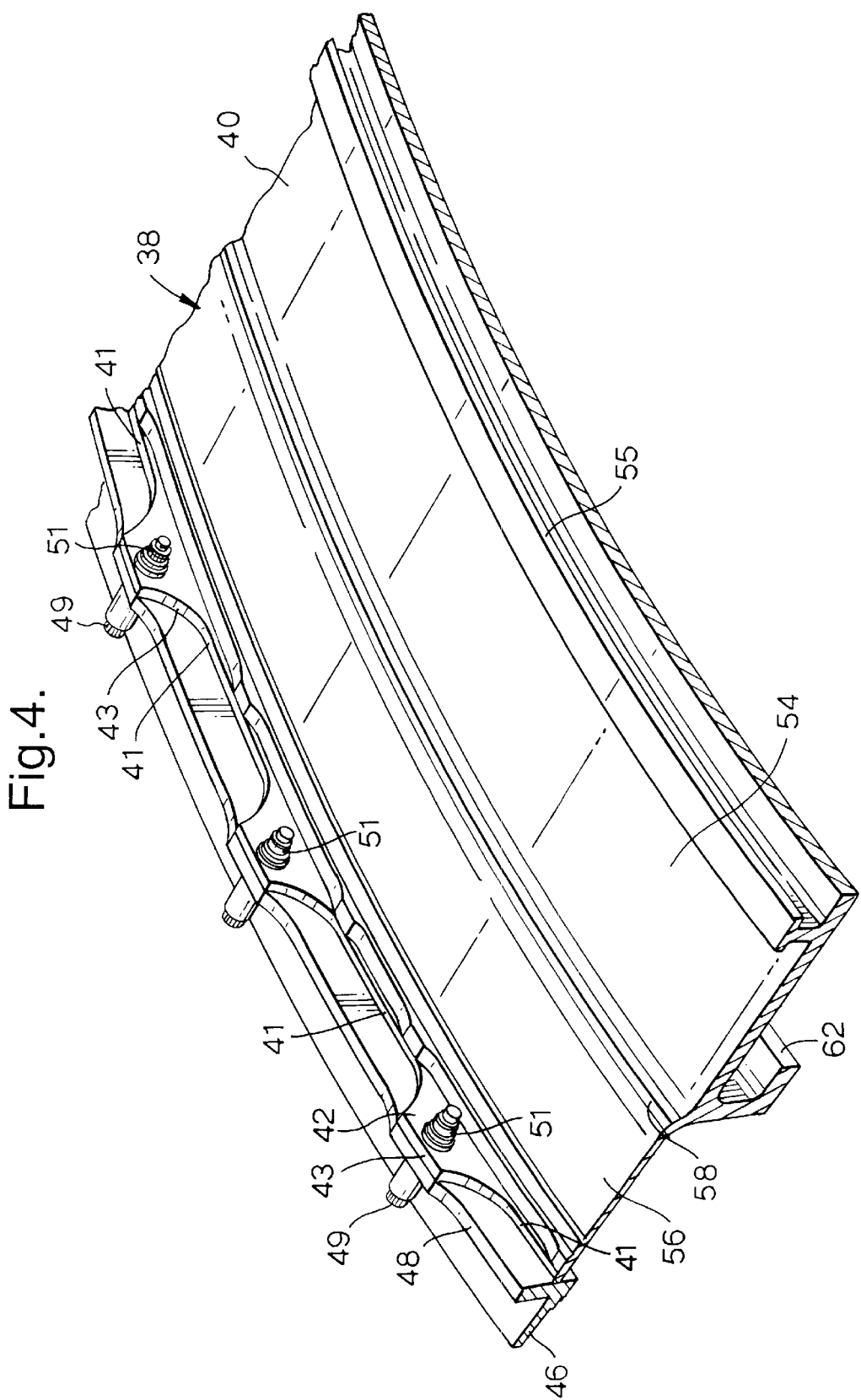

GAS TURBINE ENGINE BLADE CONTAINMENT ASSEMBLY

The present invention relates to gas turbine engine casings, particularly gas turbine engine fan casings, more particularly to an improved blade containment assembly for use within or forming a part of the gas turbine engine casing.

Turbofan gas turbine engines for powering aircraft conventionally comprise a core engine, which drives a fan. The fan comprises a number of radially extending fan blades mounted on a fan rotor which is enclosed by a generally cylindrical, or frustoconical, fan casing. The core engine comprises one or more turbines, each one of which comprises a number of radially extending turbine blades enclosed by a cylindrical, or frustoconical, casing.

There is a remote possibility that with such engines that part, or all, of a fan blade, or a turbine blade, could become detached from the remainder of the fan or turbine. In the case of a fan blade becoming detached this may occur as the result of, for example, the turbofan gas turbine engine ingesting a bird or other foreign object.

The use of containment rings for turbofan gas turbine engine casings is well known. It is known to provide generally cylindrical, or frustoconical, relatively thick metallic containment rings. It is also known to provide generally cylindrical, or frustoconical, locally thickened, isogrid, metallic containment rings. Furthermore it is known to provide strong fibrous material wound around relatively thin metallic casings or around the above mentioned containment casings. In the event that a blade becomes detached it passes through the casing and is contained by the fibrous material.

However, in the event that a blade becomes detached, the blade strikes the metal casing and a significant load is imparted from the main impact region of the metal casing to a flanged interface with an intake casing.

It is normal practice to transfer the impact loads along the metal casing to the flanged interface with the intake casing using a stepped increase in diameter of the metal casing, as shown in our published European patent application No. EP0965731A2. The stepped increase in diameter of the metal casing produces a local increase in stresses due to the bending moment at the stepped increase in diameter. The bending moments are counteracted by locally thickening the metal casing at the stepped increase in diameter of the metal casing. The locally thickened stepped increase in diameter adds weight to the metal casing, and the weight may be considerable if the metal casing is for a high bypass ratio turbofan gas turbine engine. The metal casing between the flanged interface with the intake casing and the stepped increase in diameter of the metal casing has a reduced thickness relative to the main impact zone of the metal casing.

Accordingly the present invention seeks to provide a novel gas turbine engine casing which reduces the loads transferred to the flange of the intake casing.

Accordingly the present invention provides a gas turbine engine rotor blade containment assembly comprising a generally cylindrical, or frustoconical, containment casing, the containment casing having a flange for connecting the containment casing to a flange on an axially adjacent casing, the flange on the containment casing having a plurality of circumferentially spaced regions, the regions being removably connectable to the flange on the axially adjacent casing, the ratio of the thickness of the flange of the containment casing to the thickness of a portion of the containment casing adjacent to the flange is between 3 to 1 and 6 to 1, the flange on the containment casing being radially scalloped between the adjacent regions to allow the flange on the fan containment casing to deform such that loads transmitted to the fasteners and flange of the axially adjacent casing are at least reduced.

Preferably the containment casing has an upstream portion and a blade containment portion, the flange is on the upstream portion of the containment casing and the ratio of the thickness of the flange on the upstream portion of the containment casing to the thickness of the upstream portion of the containment casing is between 3 to 1 and 6 to 1.

Preferably the flange on the portion of the containment casing is radially scalloped to the diameter of the outer surface of the portion of the containment casing.

Preferably the containment casing comprises a transition portion, the diameter of the upstream portion being greater than the diameter of blade containment portion, the transition portion connecting the blade containment portion and the upstream portion to transmit loads from the blade containment portion to the upstream flange.

Preferably the transition portion having a smoothly curved increase in diameter between the blade containment portion and the upstream portion whereby the transition region is allowed to flex to reduce impact loads transmitted to the upstream flange.

Preferably the thickness of the transition portion being substantially the same as the thickness of the upstream portion of the containment casing.

The thickness of the transition portion may be between 75% and 125% of the thickness of the upstream portion of the containment casing.

The containment casing may have ribs and/or flanges. One or more continuous layers of a strong fibrous material may be wound around the containment casing.

The containment casing may comprise any suitable metal or metal alloy. Preferably the metal containment casing comprises a steel alloy, aluminium, an aluminium alloy, magnesium, a magnesium alloy, titanium, a titanium alloy, nickel or a nickel alloy.

An acoustic lining may be provided within the containment casing.

The blade containment portion may have a radially inwardly and axially upstream extending flange, the flange being arranged at the upstream end of the blade containment portion.

Preferably the thickness of the blade containment portion is greater than the thickness of the upstream portion.

The containment casing may be a fan containment casing, a compressor containment casing or a turbine containment casing.

The present invention will be more fully described by way of example with reference to the accompanying drawings in which:

FIG. 3 is a further enlarged cross-sectional view through a portion of the fan blade containment assembly shown in FIG. 2.

FIG. 4 is an enlarged perspective view of a portion of the fan blade containment assembly shown in FIG. 2.

Figure 1:
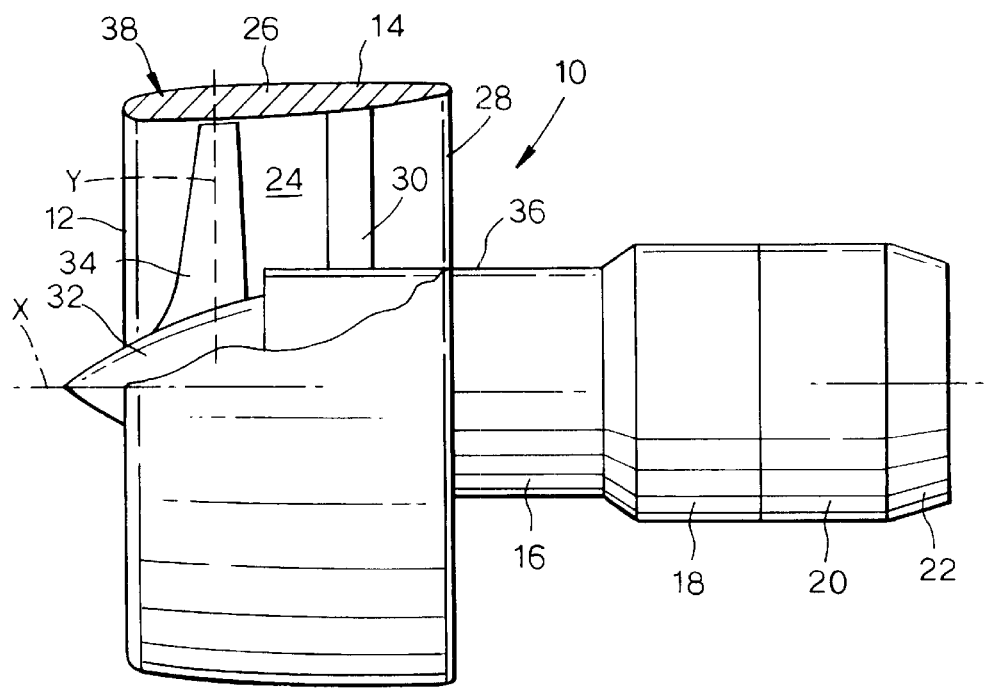
FIG. 1 is a partially cut away view of a gas turbine engine having a fan blade containment assembly according to the present invention.

A turbofan gas turbine engine 10, as shown in FIG. 1, comprises in flow series an intake 12, a fan section 14, a compressor section 16, a combustor section 18, a turbine section 20 and an exhaust 22. The turbine section 20 comprises one or more turbines arranged to drive one or more compressors in the compressor section 16 via shafts (not shown). The turbine section 20 also comprises a turbine to drive the fan section 14 via a shaft (not shown). The fan section 14 comprises a fan duct 24 defined partially by a fan casing 26. The fan duct 24 has an outlet 28 at its axially downstream end. The fan casing 26 is secured to the core engine casing 36 by a plurality of radially extending fan outlet guide vanes 30. The fan casing surrounds a fan rotor 32, which carries a plurality of circumferentially spaced radially extending fan blades 34. The fan rotor 32 and fan blades 34 rotate about the axis X of the gas turbine engine 10, substantially in a plane Y perpendicular to the axis X. The fan casing 26 also comprises a fan blade containment assembly 38, which is arranged substantially in the plane of the fan blades 34.

Figure 2:
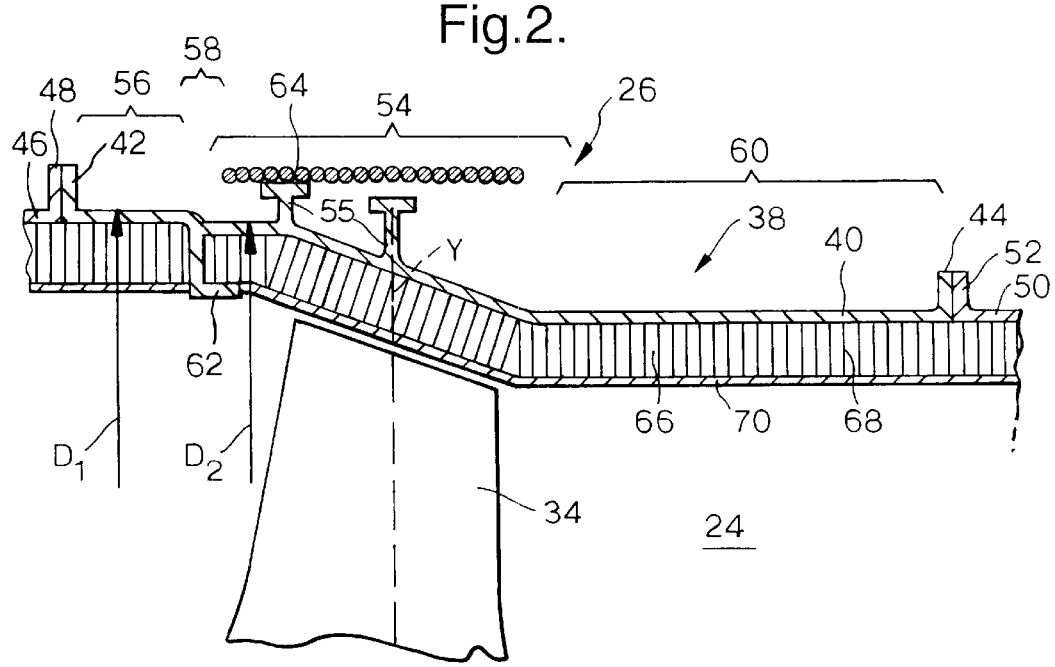
FIG. 2 is an enlarged cross-sectional view of the fan blade containment assembly shown in FIG. 1.

The fan casing 26 and fan blade containment assembly 38 is shown more clearly in FIGS. 2, 3 and 4. The fan blade containment assembly 38 comprises a metal cylindrical, or frustoconical, casing 40. The metal casing 40 comprises an upstream flange 42 by which the fan blade containment assembly 38 is connected to a flange 48 on an intake assembly 46 of the fan casing 26. The metal casing 40 also comprises a downstream flange 44 by which the fan blade containment assembly 38 is connected to a flange 52 on a rear portion 50 of the fan casing 26.

The metal casing 40 provides the basic fan blade containment and provides a connection between the intake casing 46 and the rear casing 50.

The metal casing 40 comprises an upstream portion 56, a transition portion 58, a main blade containment portion 54 and a downstream portion 60. The upstream portion 56 comprises the flange 42 and the downstream portion 60 comprises the flange 52. The flange 42 on the upstream portion 56 of the metal casing 40 is fastened to the flange 48 on the intake casing 46 by a plurality of equally circumferentially spaced, axially extending, bolts 49 and associated nuts 51.

The upstream portion 56 is upstream of the plane Y of the fan blades 34 and provides debris protection for the fan blade containment assembly 38. The main blade containment portion 54 is substantially in the plane Y containing the fan blades 34 and comprises a radially inwardly and axially downstream extending flange, or hook, 62 at its upstream end. The main blade containment portion 54 may also comprise one, or more, integral T section ribs 55, which extend radially outwardly from the main blade containment portion 54. The T section ribs 55 extend circumferentially around the main blade containment portion 54 to stiffen the metal casing 40 to improve the fan blade 34 containment properties. The transition portion 58 connects the main blade containment portion 54 and the upstream portion 56 to transmit loads from the main blade containment portion 54 to the upstream flange 42 on the upstream portion 56. The downstream portion 60 is downstream of the plane Y of the fan blades 34, and provides protection for where a root of a fan blade 34 impacts the fan blade containment assembly 38.

The upstream portion 56 of the metal casing 40 has a diameter $D_1$ greater than the diameter $D_2$ of the main blade containment portion 54. The main blade containment portion 54 has a thickness $T_2$ greater than the thickness $T_1$ of the upstream portion 56 of the metal casing 40.

The transition portion 58 has a smoothly curved increase in diameter between the diameter $D_2$ of the main blade containment portion 54 and the diameter $D_1$ of the upstream portion 56. The transition portion 58 has a thickness $T_3$ substantially the same as the thickness $T_1$ of the upstream portion 56. In particular the smoothly curved increase in diameter of the transition portion 58, in axial section, is defined by two large diameter radius $R_1$ and $R_2$ at its outer surface and a single radius $R_3$ at its inner surface.

The upstream portion 56 of the metal casing 40 is designed to minimise the transmission of loads, generated by the impact of one or more fan blades 34, or portions of fan blades 34, on the blade containment portion 54 of the metal casing 40, to the intake casing 46. In particular the flange 42 on the upstream portion 56 of the metal casing is radially scalloped 41 circumferentially between adjacent bolts 49. The radial scallops 41 are regions of the flange 42 where the outer diameter $D_3$ of the flange 42 has a smaller diameter than the diameter $D_4$ of the regions 43 of the flange 42 where the bolts 49 extend through apertures 45 in the flange 42 and apertures 47 in the flange 48. The scallops 41 are produced by machining, or cutting back, those regions of the flange 42 to a suitable diameter. The scallops 41 are preferably machined to the outer diameter of the upstream portion 56 of the metal casing 40. The ratio between axial thickness $T_4$ of the flange 42 and the radial thickness $T_1$ of the upstream portion 56 of the metal casing 40 is between 3 to 1 and 6 to 1.

It may be desirable in some circumstances to provide a number of continuous layers of a strong fibrous material 64 wound around the metal casing 40 to further increase the energy absorbing capability of the fan blade containment assembly 38. The strong fibrous material 64 may for example be woven aromatic polyamide fibres known as KEVLAR (KEVLAR is a registered trademark of Dupont Ltd). There may also be a number of layers of discrete pieces of flexible material woven from KEVLAR between the metal casing 40 and the continuous layers of fibrous material 64.

An acoustic lining 66 may be provided on the inner surface of the metal casing 40. The acoustic lining 66 comprises a honeycomb 68 and a perforate sheet 70. The honeycomb 68 and perforate sheet 70 are quite conventional.

In operation of the gas turbine engine 10, in the event that a fan blade 34, or a portion of a fan blade 34, becomes detached it encounters the metal casing 40. The main blade containment portion 54 of the metal casing 40 is impacted by the fan blade 34, or portion of the fan blade 34, and effectively removes energy from the fan blade 34, or portion of the fan blade 34.

The impact loads are transferred from the main blade impact portion 54 of the metal casing to the flange 52 on the upstream portion 56 of the metal casing 40 through the transition portion 58 of the metal casing 40. The transition portion 58 is arranged to flex during the impact, due to its smoothly curved shape, to reduce the impact loads transmitted to the upstream flange 52. Additionally the scallops 41 remove the hoop stress from the flange 42 and this allows the flange 42 to deform locally. Also the upstream portion 54 of the metal casing 40 deforms because of its relatively thin section. The flange 42 and the upstream portion 54 of the metal casing 54 deform substantially without transferring loads to the bolts 49 and flange 48 of the intake casing 46.

The metal casing may be manufactured from any suitable metal or metal alloy. Preferably the metal casing comprises a steel alloy, aluminium, an aluminium alloy, magnesium, a magnesium alloy, titanium, a titanium alloy, nickel or a nickel alloy.

Although the invention has been described with reference to a metal casing it may be possible to use the invention on other types of casings.

Although the invention has been described with reference to bolts and nuts fastening the flanges together, other suitable fasteners may be used.

The invention has been described with reference to a fan blade containment assembly, however it is equally applicable to a compressor blade containment assembly and a turbine blade containment assembly.

Although the present invention has been described with reference to a ribbed metal containment casing, it is equally applicable to other types of containment casing, for example a fibrous material wound around a relatively thin metallic casing or a fibrous material wound around a ribbed metal containment casing.

We claim:

1. A gas turbine engine rotor blade containment assembly comprising a containment casing, the containment casing having a flange for connecting the containment casing to a flange on an axially adjacent casing, the flange on the containment casing having a plurality of circumferentially spaced regions, the regions being removably connectable to the flange on the axially adjacent casing, the ratio of the thickness of the flange of the containment casing to the thickness of a portion of the containment casing adjacent to the flange is between 3 to 1 and 6 to 1, the flange on the containment casing being radially scalloped between the adjacent regions to allow the flange on the fan containment casing to deform such that loads transmitted to the fasteners and flange of the axially adjacent casing are at least reduced.

2. A gas turbine engine rotor blade containment assembly as claimed in claim 1 wherein the flange of the containment casing is radially scalloped to the diameter of the outer surface of the portion of the containment casing.

3. A gas turbine engine rotor blade containment assembly as claimed in claim 1 wherein the containment casing has ribs and/or flanges.

4. A gas turbine engine rotor blade containment assembly as claimed in claim 1 wherein one or more continuous layers of a strong fibrous material are wound around the containment casing.

5. A gas turbine engine rotor blade containment assembly as claimed in claim 1 wherein the containment casing comprises a metal selected from the group comprising a steel alloy, aluminium, an aluminium alloy, magnesium, a magnesium alloy, titanium, a titanium alloy, nickel and a nickel alloy.

6. A gas turbine engine rotor blade containment assembly as claimed in claim 1 wherein an acoustic lining is provided within the containment casing.

7. A gas turbine engine rotor blade containment assembly as claimed in claim 1 wherein the containment casing is a fan containment casing, a compressor containment casing or a turbine containment casing.

8. A gas turbine engine rotor blade containment assembly as claimed in claim 1 wherein the casing is generally cylindrical.

9. A gas turbine engine rotor blade containment assembly as claimed in claim 1 wherein the casing is generally frustoconical.

10. A gas turbine engine rotor blade containment assembly comprising a containment casing, the containment casing having a flange for connecting the containment casing to a flange on an axially adjacent casing, the flange on the containment casing having a plurality of circumferentially spaced regions, the regions being removably connectable to the flange on the axially adjacent casing, the flange on the containment casing being radially scalloped between the adjacent regions to allow the flange on the fan containment casing to deform such that loads transmitted to the fasteners and flange of the axially adjacent casing are at least reduced wherein the containment casing has an upstream portion and a blade containment portion, the flange is on the upstream portion of the containment casing and the ratio of the thickness of the flange on the upstream portion of the containment casing to the thickness of the upstream portion of the containment casing is between 3 to 1 and 6 to 1.

11. A gas turbine engine rotor blade containment assembly as claimed in claim 10 wherein the containment casing comprises a transition portion, the diameter of the upstream portion of the casing being greater than the diameter of blade containment portion, the transition portion connecting the blade containment portion and the upstream portion to transmit loads from the blade containment portion to the upstream flange.

12. A gas turbine engine rotor blade containment assembly as claimed in claim 11 wherein the transition portion having a smoothly curved increase in diameter between the blade containment portion and the upstream portion whereby the transition region is allowed to flex to reduce impact loads transmitted to the flange on the upstream portion of the containment casing.

13. A gas turbine engine rotor blade containment assembly as claimed in claim 11 wherein the thickness of the transition portion being substantially the same as the thickness of the upstream portion of the containment casing.

14. A gas turbine engine rotor blade containment assembly as claimed in claim 11 wherein the thickness of the transition portion being between 75% and 125% of the thickness of the upstream portion of the containment casing.

15. A gas turbine engine rotor blade containment assembly as claimed in claim 10 wherein the blade containment portion has a radially inwardly and axially downstream extending flange, the flange being arranged at he upstream end of the blade containment portion.

16. A gas turbine engine rotor blade containment assembly as claimed in claim 10 wherein the thickness of the blade containment portion is greater than the thickness of the upstream portion.

* * * * *